United States Patent

[11] 3,616,058

| [72] | Inventors | John C. Fuller<br>5221 S.E. Naef Road, Milwaukie, Oreg. 97222;<br>Gordon W. Fuller, 7320 S.W. Landeau St., Portland, Oreg. 97223; Ralph A. Fuller, 12220 S.W. Grant, Tigard, Oreg. 97221;<br>William I. Fuller, P.O. Box 123, Wilsonville, Oreg. 97070 |
|---|---|---|
| [21] | Appl. No. | 762,843 |
| [22] | Filed | Sept. 26, 1968 |
| [45] | Patented | Oct. 26, 1971 |

[54] APPARATUS FOR VENTING PNEUMATIC TIRES
9 Claims, 5 Drawing Figs.

[52] U.S. Cl. .................................................. 156/398,
83/2, 254/50.3
[51] Int. Cl. .................................................. B29h 17/24
[50] Field of Search .......................................... 83/2, 660;
157/13; 254/50.3, 50.4; 156/87, 398, 510

[56] References Cited
UNITED STATES PATENTS

| 2,541,659 | 2/1951 | McGovern | 254/50.3 |
|---|---|---|---|
| 3,107,565 | 10/1963 | Hermanns | 83/2 |

FOREIGN PATENTS

| 52,859 | 6/1944 | France | 254/50.3 |
|---|---|---|---|

Primary Examiner—Benjamin A. Borchelt
Assistant Examiner—Stephen C. Bentley
Attorney—Oliver D. Olson ABSTRACT: A plurality of opposed pairs of circumferentially spaced support assemblies retractably support a pneumatic tire between them with the opposed tire beads pressed together for mutual support. A power-driven piercing memoer on each support assembly then is driven into the tire angularly from a point on the surface outward of the wheel rim area to a point adjacent the bead. After retraction of the piercing members the support assemblies are retracted to release the vented tire.

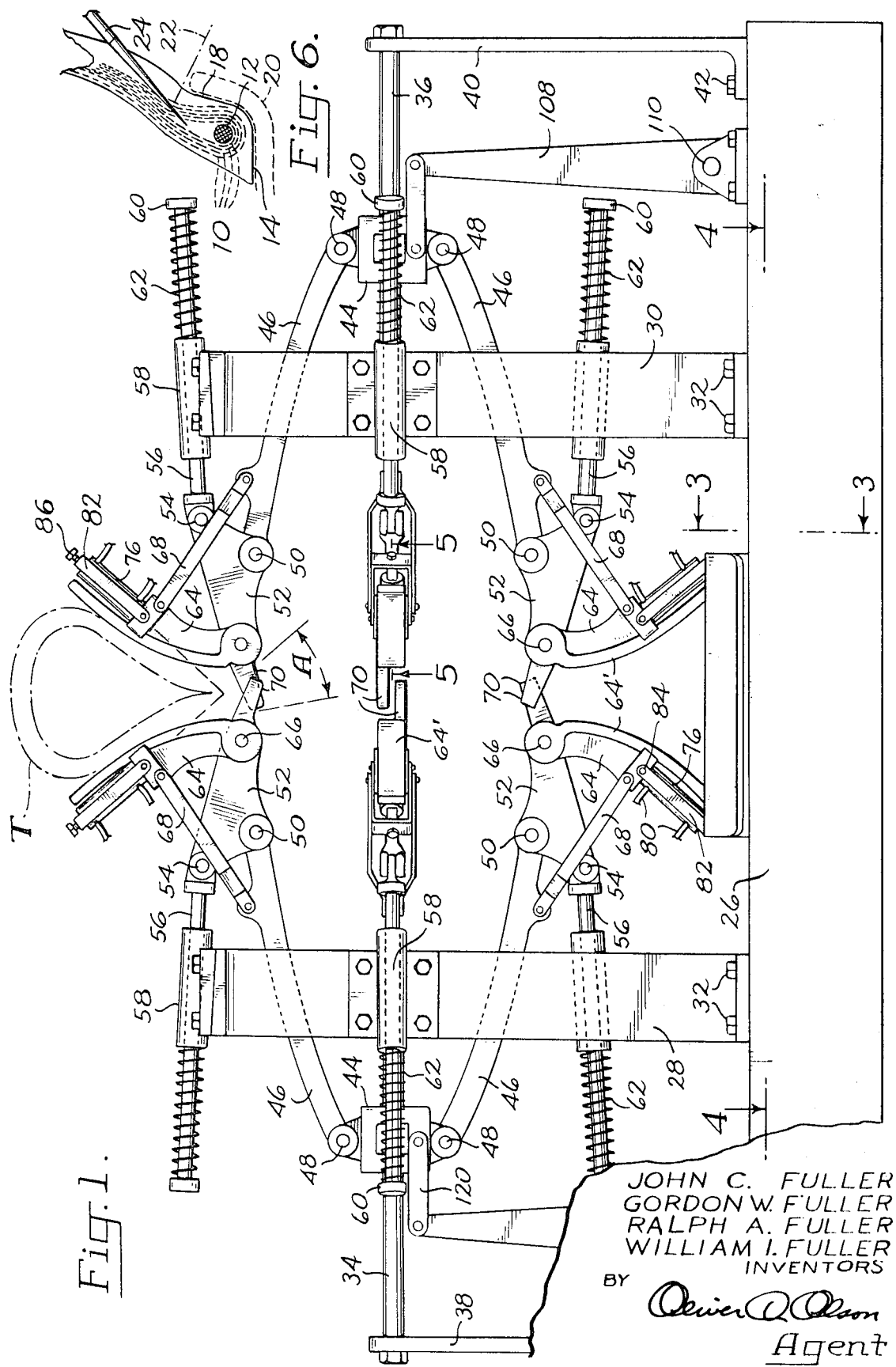

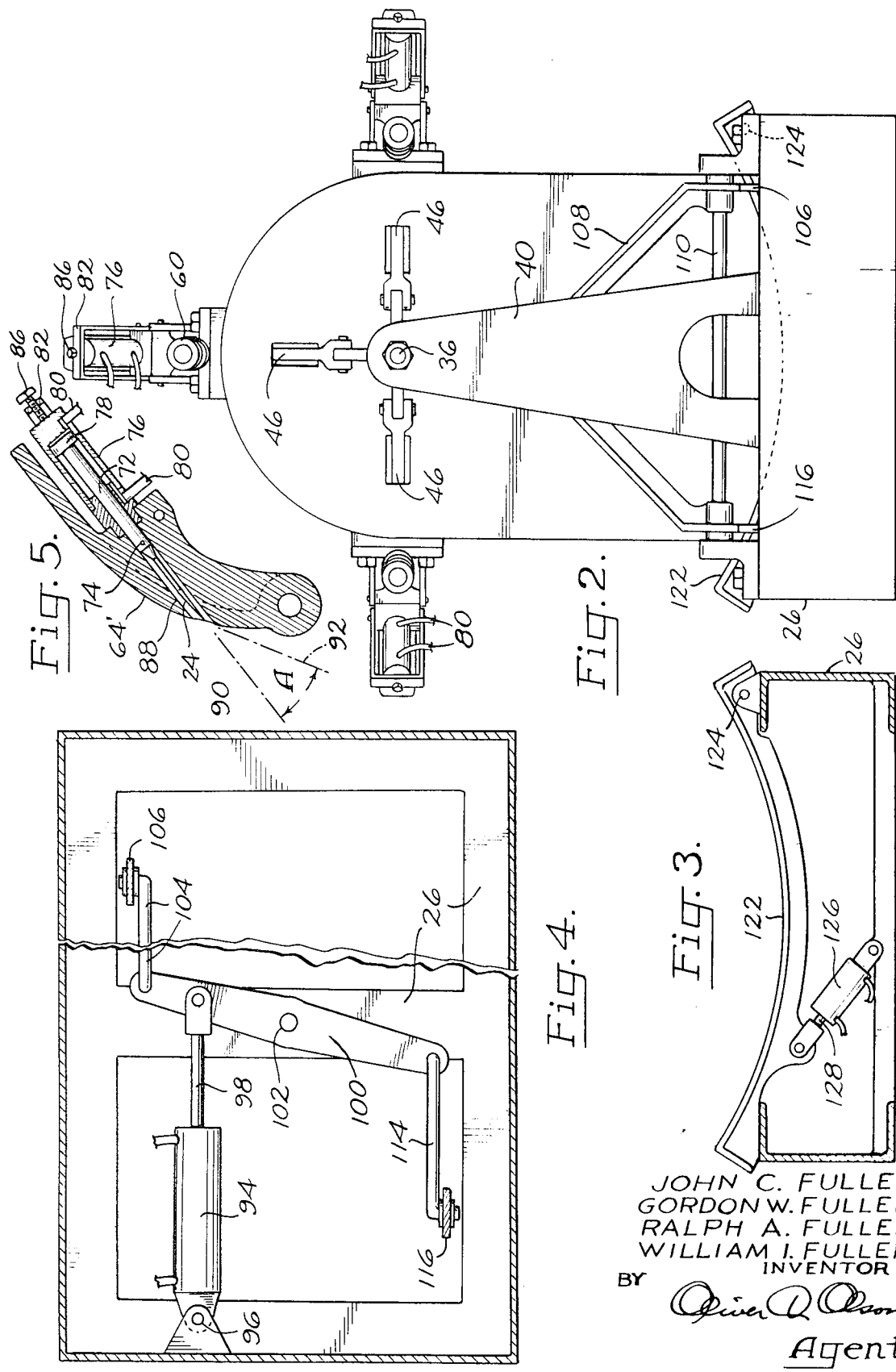

APPARATUS FOR VENTING PNEUMATIC TIRES

BACKGROUND OF THE INVENTION

This invention relates to apparatus for venting pneumatic tires, and more particularly to apparatus by which pneumatic tires may be bead-vented simultaneously at a plurality of circumferentially spaced points on both sides of the tire.

External venting of pneumatic tires has long been recognized as a necessity to relieve the substantial air pressure which may develop with the cord body of new or retread casings. It is universally recognized in the art that in the absence of external venting the development of internal air pressure within the cord body, often reaching magnitudes in excess of 20 p.s.i., is a major cause of ply and top ply separations.

It has been found that as air enters the cord body it travels to the bead area and then redistributes throughout the casing. Accordingly the venting of the bead area is most effective in relieving air pressure within the cord body.

Apparatus provided heretofore for bead-venting pneumatic tires are not completely satisfactory. The use of hand manipulated drills or awls present the difficulty of inconsistent accuracy of penetration of the tire casing to the desired depth.

The foregoing difficulty has been overcome by applicant's prior hand-manipulating apparatus disclosed in their U.S. Pat. No. 3,352,013 and in their pending application Ser. No. 495,545 filed Oct. 13, 1965 for apparatus for venting pneumatic tires, now U.S. Pat. No. 3,448,520 . The primary disadvantage of such apparatus, as with the prior procedures explained hereinbefore, resides in the fact that only one vent can be produced at one time. Since pneumatic tires should be vented at a plurality of circumferentially spaced positions adjacent both beads, these prior venting procedures involve so much time and cost as to make them economically impracticable for mass production operators.

Apparatus provided heretofore for producing multiple vents simultaneously are characterized by two principal disadvantages. First, they function to vent only one side of a tire at one time, thereby requiring the additional labor cost of repeating the operation for the other side. Second, because of the angle of perpetration of the tire by the piercing elements and because of the variations in thicknesses of the tire casings, precise readjustment of the elements must be made for each type and size of tire. This contributes adversely to the speed and cost of mass production of vented tires.

SUMMARY OF THE INVENTION

In its basic concept the apparatus of the present invention provides for the bead-venting of pneumatic tires on a mass production scale by producing vent openings simultaneously at a plurality of circumferentially spaced points on both sides of the tire and to proper depth and location adjacent the beads with minimum adjustment for variations in tire sizes and types.

It is by virtue of the foregoing basic concept that the principal objective of the present invention is achieved, namely to overcome the disadvantages of prior apparatus, as enumerated hereinbefore.

Another important object of this invention is the provision of apparatus for bead-venting pneumatic tires, which apparatus functions automatically to accommodate tires of varying sizes.

A further important object of the present invention is the provision of apparatus for bead-venting pneumatic tires, which apparatus is of simplified construction, is operable with precision and is capable of long service life with minimum maintenance and repair.

The following and other objects and advantages of this invention will appear from the following detailed description, taken in connection with the accompanying drawings of the preferred embodiment.

BRIEF DESCRIPTION OF THE DRAWINGS

FIG. 1 is a fragmentary front elevation of apparatus embodying the features of the present invention.

FIG. 2 is an end elevation as viewed from the right in FIG. 1.

FIG. 3 is a sectional view taken on the line 3—3 in FIG. 1.

FIG. 4 is a foreshortened sectional view taken on the line 4—4 in FIG. 1.

FIG. 5 is a fragmentary sectional view taken on the line 5-5 in FIG. 1.

FIG. 6 is a fragmentary sectional view showing schematically a typical pneumatic tire construction and a preferred manner of bead-venting the same, the tire being shown in association with a wheel rim illustrated in dotted lines.

DESCRIPTION OF THE PREFERRED EMBODIMENT

Referring first to FIG. 6 of the drawings, there is illustrated schematically a portion of a typical pneumatic tire of four ply construction. The four plies of cord 10 are wrapped around the annular bead 12 adjacent the heel edge 14, defining a central area 16 adjacent the bead. The heel edge and the adjacent outer portion 18 of the tire abuts the rim portion 20 of a vehicle wheel. Accordingly, it is desirable to vent the bead area in such manner that air may escape through vent openings which terminate at the outer surface of the tire outward of the wheel rim.

Although the vent openings may be directed substantially along the dot-and-dash line 22, which is substantially perpendicular to the sidewall of the tire, as provided for in prior apparatus, it is preferred that the vent openings be provided angularly inward in the direction illustrated by the piercing element 24. It can be seen that the depth of penetration of the element into the central area 16 may vary considerably without being too deep or too shallow, since it traverses a substantial angular thickness of the central area. On the other hand, if the piercing element were directed on the dot-and-dash line 22, its depth of penetration is very critically limited because of the narrowness of the central area 16 at that point. This critical depth of penetration is made even more difficult of achievement because of varying thicknesses of sidewall rubber in different sizes and types of tires.

Referring now primarily to FIG. 1 of the drawings, the apparatus illustrated includes a hallow base frame 26 mounting a pair of longitudinally spaced, upstanding, transverse supports 28 and 30 secured thereto by such means as the bolts 32. Secured at their inner ends one to each of the supports and projecting longitudinally outward therefrom on a common longitudinal axis are a pair of guide rods 34 and 36. The outer ends of the guide rods are supported one by each of the upstanding brackets 38 and 40 secured to the base frame by such means as the bolts 42.

Mounted slidably on each guide rod is a guide block 44. Each guide block supports the outer ends of a plurality of arms 46 pivotally by means of the pivot pins 48. In the embodiment illustrated there are four such arms associated with each block, arranged symmetrically at 90° intervals about the longitudinal axis of the guides rods.

The inner end of each arm 46 is connected pivotally, by means of the pivot pin 50, to a tire-centering lever 52, intermediate the ends of the latter. A pivot pin 54 mounted on the lever radially and longitudinally outward of the pivot pin 50, pivotally connects the inner end of a pressure rod 56. Each pressure rod extends longitudinally outward through a bearing 58 secured to its associated support 28 or 30, and its outer end is provided with an enlarged head 60. Interposed between the head and the bearing is a coil spring 62.

Each tire-centering lever 52 also supports a tire-pressing lever 64 pivotally by the pivot pin 66 located between the pivot pin 50 and the inner end of the lever 52.

Each tire-pressing lever also is connected pivotally to its associated arm 46 by means of the pair of laterally spaced links 68. The inwardly facing surface 64' of each tire pressing lever 64 functions to abut the adjacent sidewall 18 of the tire and thus conform the latter to its shape. The portion of the lever inward of the pivot pin 66 forms a finger 70 adapted to engage the heel edge 14 of a tire for centering the latter on the axis of the guide rods, as explained more fully hereinafter. The cooperating fingers of each pair are offset laterally from each other, as illustrated.

Each of the tire-pressing levers 64 also supports a tire-piercing member. In the embodiment illustrated, and best shown in FIG. 5, the tire-piercing member comprises an elongated awl 24 secured removably in a bore in the projecting end of the piston rod 72, by such means as the setscrew 74. The piston rod extends slidably into a cylinder 76 and is attached to a piston 78 which is reciprocative in the cylinder by appropriate application of fluid pressure, either air or hydraulic, through the conduits 80 communicating with the opposite ends of the cylinder. The cylinder is mounted removably on the lever. In the embodiment illustrated the inner end of the cylinder is received in a socket in the lever, and a U-shaped strap 82 straddles the cylinder. The spaced ends of the strap are secured pivotally to the lever, by means of the pivot pins 84, and the closed end of the strap has a threaded opening which receives the clamping screw 86 which releasably engages the outer end of the cylinder.

The elongated awl and piston rod are movable longitudinally in a bore 88 provided in the lever. In the retracted position the pointed end of the awl is confined within the bore, and in its extended positions it projects across the tire abutting surface of the lever. In the preferred embodiment illustrated, the included angle A formed between the axis 90 of reciprocation of the awl and the tangential plane 92 of the tire abutting surface 64' of the lever 64 is about 32°. This angle provides proper venting of most sizes and types of conventional passenger car tires. However, this angle may be varied over a considerable range to accommodate certain other sizes and types of tires.

Means is provided for reciprocating the guide blocks 44 longitudinally on the guide rods simultaneously inward and outward. In the embodiment illustrated, and best shown in FIG. 4, this means comprises a fluid pressure cylinder 94, either air or hydraulic, mounted pivotally at one end of the base frame, as by means of the pivot pin 96. The projecting end of the piston rod 98 associated with the cylinder is connected pivotally to a lever 100 which is mounted intermediate its ends on the pivot pin 102 supported by the base frame 26. One end of the lever is connected pivotally through the link 104 to the downward extension 106 on one leg of the Y-shaped lever 108 (FIG. 1). This lever is mounted transversely of the base frame for pivotal movement on the pivot shaft 110. The upper end of the lever is connected pivotally through the link 112 to the associated block 44.

In similar manner, the opposite end of the lever 100 is connected through the link 114 to the downward extension 116 of the Y-shaped lever 118. Like the first named lever 108, this lever is mounted transversely of the base frame for pivotal movement and is connected pivotally at its upper end through the link 120 to the associated block 44.

Means also is provided, in the embodiment illustrated, for ejecting a pneumatic tire from the apparatus after the venting operation has been completed. Referring to FIG. 3 of the drawings, a transversely concave ejector plate 122 extends laterally across the base frame and its rearward end is secured pivotally to the base frame by means of the pivot pin 124. A fluid pressure cylinder 126, either air or hydraulic, is secured pivotally at one end of the piston rod 128 is connected pivotally to the ejector plate. Accordingly, upon extension of the piston rod from the cylinder, the ejector plate is pivoted clockwise about the pivot pin 124.

The operation of the apparatus described hereinbefore is as follows:

With fluid pressure applied to the cylinder 94 to retract the associated piston rod 98 and pivot the connected lever 100 counterclockwise (FIG. 4), the guide blocks 44 are moved longitudinally outward, carrying with them the connected arms 46. The outer ends of the tire-centering levers 52 move outward into abutment with the bearings 58, whereupon further outward movement of the arms causes the tire-centering levers to pivot inward. The circle described by the fingers 70 thus is decreased in diameter.

With the opposed pairs of pressing units, comprising aligned pairs of tire-centering levers 52 and associated tire-pressing levers 64, spaced apart longitudinally, a tire T is placed upon the ejector plate 122 vertically between the spaced pressing units. Fluid pressure then is supplied to the cylinder 94 to extend the associated piston rod 98 and pivot the lever 100 clockwise (FIG. 4) and move the guide blocks 44 longitudinally inward.

As the guide blocks move inward, carrying with them the arms 46 and tire centering levers 52, the fingers 70 move longitudinally inward and radially outward. The uppermost pair of fingers first engage the spaced heel edges 14 of the opposed bead portions of the tire. Further radial movement of the fingers in the outward direction thereupon lifts the tire from the ejector plate, until the axis of the tire is coincident with the common axis of the guide rods 34 and 36. In this position the remaining pairs of centering fingers abut the adjacent heel edges of the tire.

Further radial outward movement of the tire-centering levers 52 is resisted by the strength of the inner beaded peripheries of the tire. Accordingly, further inward movement of the tire-centering levers longitudinally with the arms 46 and blocks 44 is accommodated resiliently by the coil springs 62 which function to maintain positive abutment of the fingers 70 with the heel edge portions of the tire.

As the opposed pairs of tire-pressing levers 64 move inward, they force the opposed bead portions of the tire together into mutual abutment, as illustrated in dot-and-dash lines in FIG. 1. With the bead portions thus supporting each other at their inner surfaces, fluid pressure is delivered to the outer ends of each of the cylinders 76, to drive the piercing members 24 outward from the tire pressing levers 64 and into the opposed sidewall portions of the tire, angularly toward the tire beads 12. Since the tire abutting surfaces 64' of the levers 64 have conformed the outer surfaces of the tire sidewalls to their shape, the angle of penetration of the piercing member 24 is maintained substantially constant for all sizes and types of tires within a predetermined range.

When the piercing members 24 reach their predetermined depth of penetration into the central areas 16 adjacent the beads 12, fluid pressure then is applied to the inner ends of the cylinders 76 to retract the piercing members. Since, in the embodiment illustrated there are four opposed pairs of pressing units and associated tire piercing units, the tire thus will have been provided with four circumferentially spaced vent openings on each side of the tire.

Fluid pressure now is supplied to the inner end of the cylinder 94 to pivot the lever 100 counterclockwise (FIG. 4) and move the guide blocks 44 longitudinally outward to retract the tire pressing units. The tire drops by gravity into contact with the ejector plate 122, from whence it is ejected from the apparatus by the application of fluid pressure to the cylinder 126 in the direction to extend the piston rod 128 and pivot the ejector plate clockwise about the pivot pin 124 (FIG. 3).

Actuation of the fluid pressure cylinders 76, 94 and 126 may be controlled manually, or automatically on a timed sequence. Such automatic operation may be achieved, for example, by the use of electric solenoid valves in the fluid lines associated with the cylinders, the electric circuits of the solenoids being controlled by a conventional multiple contact timer switch, many types of which are commercially available and well known in the art.

The number of opposed pairs of pressing units may be varied, as desired, to provide fewer or more pairs than the four illustrated. Although it is preferred that each pressing unit incorporate a tire piercing unit, the latter may be omitted from some of the pressing units. Further, although the awl type piercing member is preferred, it may be replaced by a power driven rotary drill assembly. Various other changes and modifications in the size, shape, number and type of components described hereinbefore may be made, as will be apparent to those skilled in the art.

Having now described our invention and the manner in which it may be used, we claim:

1. Apparatus for venting a pneumatic tire having opposed bead areas at the inner periphery thereof, comprising
   a. a frame,
   b. tire bead press means frame the fame engageable with the opposed bead areas of the tire and movable between a retracted position in which the bead areas are spaced apart and an operative position abutting the sidewalls of a tire and pressing together the opposed bead area thereof for mutual support, and
   c. tire-piercing means on the frame arranged for reciprocative movement between a retracted position outward of the tire and an extended position terminating within the tire adjacent the bead areas thereof.

2. The apparatus of claim 1 wherein the press means comprises
   a. a plurality of opposed pairs of tire support means spaced apart circumferentially about a common axis, and
   b. means mounting the support means on the frame for reciprocative movement longitudinally and transversely of said common axis for releasably supporting a tire on said axis and retractably pressing together the opposed bead areas of the tire.

3. The apparatus of claim 2 wherein each support means includes a tire centering portion arranged to engage the inner periphery of the tire, and a tire sidewall pressing portion arranged to engage the sidewall of the tire adjacent the bead area thereof.

4. The apparatus of claim 3 wherein the tire-piercing means comprises
   a. a plurality of tire-piercing members,
   b. a plurality of reciprocative drive means each engaging one of the tire-piercing members, and
   c. means mounting the drive means one on the tire sidewall pressing portion of each support means.

5. The apparatus of claim 4 wherein the included angle formed between the axis of reciprocation of the tire-piercing member and the plane of the tire sidewall pressing portion of the support means is about 32°.

6. The apparatus of claim 2 including tire-ejecting means mounted on the frame between the opposed pairs of the tire support means for movement between a retracted position outward of said common axis and an extended position toward said common axis for engaging and ejecting a tire positioned between said opposed pairs of tire support means.

7. The apparatus of claim 1 wherein the press means comprises
   a. a pair of longitudinally spaced guide rods arranged on a common longitudinal axis,
   b. guide block means reciprocative on each guide rod,
   c. a plurality of arms connected pivotally to each guide block means and spaced apart circumferentially about said common axis and extending inward of the associated guide block means,
   d. a tire-centering lever connected pivotally to the inner end of each arm,
   e. pressure rod means connected pivotally to the inner end of each arm,
   e. pressure rod means connected pivotally to each tire-centering lever and mounted on the frame for longitudinal movement substantially parallel to said common axis,
   f. resilient means interengaging the frame and each pressure rod means for resisting inward movement of the latter,
   g. the inner ends of the tire-centering levers having finger means arranged to engage the heel edges of a pneumatic tire,
   h. a tire-pressing lever connected pivotally to each tire-centering lever, and
   i. link means pivotally interconnecting each tire-pressing lever and the associated arm for pivoting the tire-pressing lever during longitudinal movement of the arm,
   j. each tire-pressing lever having an inner surface arranged to engage the sidewall portion of a tire supported by said finger means.

8. The apparatus of claim 7 wherein the tire-piercing means comprises
   a. a plurality of tire-piercing members,
   b. a plurality of reciprocative drive means each engaging one of the tire-piercing members, and
   c. means mounting the drive means one on each tire-pressing lever.

9. The apparatus of claim 1 wherein the tire-piercing means is mounted on the press means for movement therewith.

* * * * *

UNITED STATES PATENT OFFICE
CERTIFICATE OF CORRECTION

Patent No. 3,616,058            Dated 26 October 1971

Inventor(s) John C. Fuller; Gordon W. Fuller; Ralph A. Fuller; William I. Fuller It is certified that error appears in the above-identified patent and that said Letters Patent are hereby corrected as shown below:

Column 5, line 4, "frame the fame" should read --on the frame--.

Column 6, lines 15 and 16 should be deleted.

Signed and Sealed this

Fourth Day of December 1979

[SEAL]

Attest:

SIDNEY A. DIAMOND

Attesting Officer      Commissioner of Patents and Trademarks